United States Patent
Flint

(10) Patent No.: US 7,945,273 B2
(45) Date of Patent: May 17, 2011

(54) METHOD OF OPERATING A PORTABLE COMMUNICATION DEVICE, AND A PORTABLE COMMUNICATION DEVICE

(75) Inventor: Ludger Flint, Hjorring (DK)

(73) Assignee: Siemens Aktiengesellschaft, Munich (DE)

( * ) Notice: Subject to any disclaimer, the term of this patent is extended or adjusted under 35 U.S.C. 154(b) by 827 days.

(21) Appl. No.: 11/572,367

(22) PCT Filed: Dec. 17, 2004

(86) PCT No.: PCT/EP2004/053556
§ 371 (c)(1), (2), (4) Date: Jan. 19, 2007

(87) PCT Pub. No.: WO2006/007880
PCT Pub. Date: Jan. 26, 2006

(65) Prior Publication Data
US 2007/0286176 A1    Dec. 13, 2007

(30) Foreign Application Priority Data
Jul. 19, 2004   (EP) .................................. 04017034

(51) Int. Cl.
*H04W 68/00*    (2009.01)

(52) U.S. Cl. ............. 455/458; 455/515; 455/456.1; 455/456.2; 455/435.1; 370/352; 370/354

(58) Field of Classification Search ........... 455/458, 455/435.1, 414.2, 456.1, 456.2
See application file for complete search history.

(56) References Cited

U.S. PATENT DOCUMENTS

| | | | |
|---|---|---|---|
| 2002/0019241 A1* | 2/2002 | Vialen et al. | 455/458 |
| 2002/0061756 A1* | 5/2002 | Bleckert et al. | 455/458 |
| 2002/0072376 A1* | 6/2002 | Carlsson et al. | 455/458 |
| 2002/0111167 A1 | 8/2002 | Nguyen et al. | |
| 2004/0092252 A1 | 5/2004 | Gustavsson et al. | |
| 2005/0188113 A1* | 8/2005 | Lee et al. | 709/249 |

FOREIGN PATENT DOCUMENTS
WO    WO02093944    11/2002
* cited by examiner

*Primary Examiner* — Kamran Afshar
*Assistant Examiner* — Neda Behrooz
(74) *Attorney, Agent, or Firm* — King & Spalding L.L.P.

(57) ABSTRACT

A method of operating a portable communication device, wherein: in a response to receiving a paging request from a cellular network over a first communication channel the portable communication device discards the paging request, or delays transmitting a paging response, if the portable communication device has an established GPRS PDP context on a second communication channel requiring an action that can be performed within a predefined time.

13 Claims, 3 Drawing Sheets

METHOD OF OPERATING A PORTABLE COMMUNICATION DEVICE, AND A PORTABLE COMMUNICATION DEVICE

FIELD OF TECHNOLOGY

The invention relates to handling of paging requests.

BACKGROUND

Many portable communication devices are able to communicate with a cellular network using circuit-switched communication channel. Furthermore, some portable communication devices are now being able to communicate with a cellular network using a packet-switched communication channel. An example of such a portable communication device is a GSM-compatible mobile phone capable of using the General Packet Radio Service GPRS.

Building up a circuit-switched connection reserves more resources from the network. For technical and economical considerations, the circuit-switched service has in some cases priority over the packet-switched service. Especially this is the case where the portable communication device is being paged, i.e. when there is a call terminating at the portable communication device. Since a portable communication device usually has one transceiver only, and because its processing capability is rather limited, it cannot have an active packet-switched connection simultaneously with a circuit-switched connection. For GSM and GPRS this is particularly true for so-called GPRS Class B Mobiles that are defined as being able to support either packet-switched or circuit-switched communication channels, but not both simultaneously. Therefore, the packet-switched connections that are open must in some cases be suspended when a portable communication device receives a paging request.

For example, if during an established GPRS Packet Data Protocol (PDP) context some time-sensitive information, e.g. information that is useful or valid for a limited time only, has been transmitted to or from the portable communication device, suspending the GPRS connection could then in many cases obsolete the information, thereby causing a need to re-start the positioning attempt and to regenerate and re-transmit the information.

In the Secure User Plane SUPL requirement specifications of the Open Mobile Alliance OMA, this problem has been solved (e.g. for WAP) by requiring that the mobile station must enable an alternative and different communication channel (or data bearer). SMS could be selected as the different communication channel. In this case, nevertheless, the application in the portable communication device would get more complicated since it should also include a different message format for the SMS case. Furthermore, the server in the network, especially connected to or located in the packet-switched core network, would get more complicated because it should support the use of at least two communication channels and it should be able to handle a response message coming on another communication channel.

SUMMARY

An observation behind the present disclosure is that rigorously suspending all established GPRS connections in response to receiving a paging request may, in many circumstances, be non-optimal taking into account the load caused to different network elements and the potential delays of on-going operations.

Accordingly, an arrangement is required, where a balance between consuming the network resources and using network resources for submitting time-sensitive information is established.

If a portable communication device discards a paging request it has received from a cellular network, or if it delays transmitting a paging response when the portable communication device has an established packet-switched connection requiring an action that can be performed within a predefined time, finding a proper balance between using network resources at the air interface and at the core network can be facilitated. Especially in cases where some time-sensitive information has been transmitted over the GPRS connection, the retransmission can be avoided.

If transmitting the paging response is delayed only until after the action has been completed or the portable communication device has reached a predefined state, the cellular network does not necessarily need to retransmit the paging request. In this manner, the probability that a call would not be established can be reduced, since the time in which the originator of the call perceives an answer may be shortened, because the portable communication device does not need to wait for the next paging request before transmitting a paging response.

If the action is GPS location determination; and if the portable communication device has received GPS assistance information through a packet-switched connection prior to receiving the paging request but before transmitting the GPS location measurement result to the cellular network, or if transmitting the paging response is delayed only until after the measurement result has been transmitted to the cellular network, then the probability that the Location Services Center LCS in or connected to the cellular network has to retransmit GPS assistance information or to restart the whole measurement procedure can be reduced. Furthermore, as a side-effect, it is not necessary to implement means for a using an alternative communication channel, e.g. SMS, in the LCS. This reduces work and cost involved in implementing: LCS systems.

If packet-switched connections at the portable communication device are suspended only after performing the action or after the portable communication device has reached a predefined state, but before transmitting the paging response, conformity to some communication standards can still be maintained.

BRIEF DESCRIPTION OF THE DRAWINGS

The various objects, advantages and novel features of the present disclosure will be more readily apprehended from the following Detailed Description when read in conjunction with the enclosed drawings, in which.

DETAILED DESCRIPTION

Figure 1:
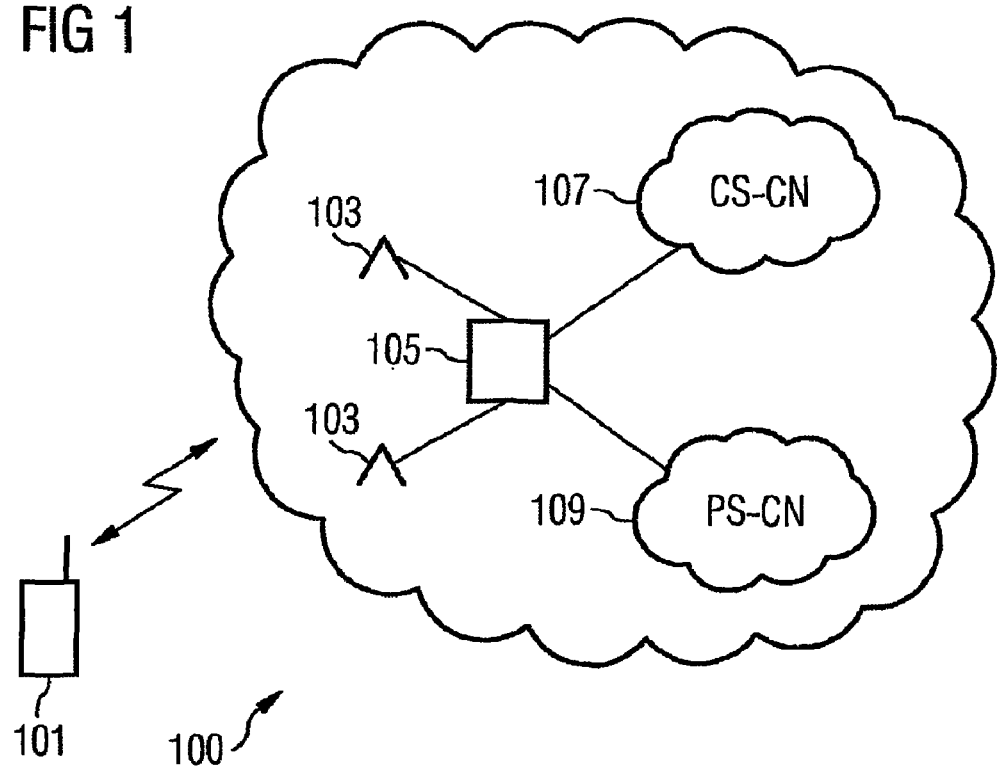
FIG. 1 illustrates some main components in a cellular network.

Same reference numerals refer to similar structural elements throughout the Figures, whereas same message names refer to 30 similar messages.

FIG. 1 illustrates some of the main components in a cellular network 100. A portable communication device 101 can be in connection with the cellular network 100 through base stations 103 which are usually controlled by a Radio Network Controller 105. Traffic from the portable communication device 101 or to the portable communication device 101 can be transmitted through one or more base stations 103 and Radio Network Controller 105 to/from Circuit-Switched Core Network CS-CN 107 or to/from Packet-Switched Core Network PS-CN 109.

In the following, an embodiment is described in more detail using a GSM/GPRS network as an example. The embodiment is not limited to this particular type of cellular network 101 but can be applied in all suitable networks following the scope of the accompanying claims. The CS-CN 107 offers circuit-switched GSM services whereas the PS-CN 109 offers GPRS services. These services are, as such, well known.

Figure 2:
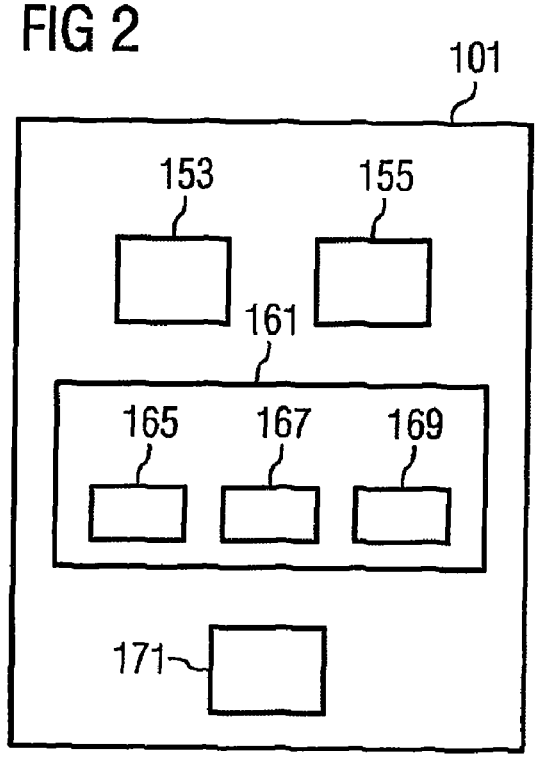
FIG. 2 is a block diagram showing some functional blocks of a portable communication device.

FIG. 2 is a simplified block diagram showing some functional blocks of a portable communication device 101. Some of the functional blocks, such as antenna and energy source—e.g. a rechargeable battery—have been omitted for the sake of clarity. The skilled person nevertheless appreciates the fact that this does not make understanding the invention any more difficult.

Portable communication device 101 includes receiving means 153 adapted to operate on at least one band of the cellular network 100. Examples of such bands for a GSM/GPRS network include GSM 850 MHz, GSM 900 MHz, GSM 1800 MHz, and GSM 1900 MHz bands. In practice, the receiving means 153 usually comprises an antenna, a receiver, a mixer, an amplifier, a decoder etc.

Portable communication device 101 further includes transmitting means 155 adapted to operate on at least one band of the cellular network 100. Examples of such bands for a GSM/GPRS network include GSM 850 MHz, GSM 900 MHz, GSM 1800 MHz, and GSM 1900 MHz bands. In practice, the transmitting means 155 usually comprises a coder, a mixer, an amplifier, a transmitter, an antenna etc.

Portable communication device 101 further includes a base band unit, or a processing unit 161 which is adapted to control the receiving means 153 and the transmitting means 155. The receiving means 153 and transmitting means 155 can preferably be used for communication with the CS-CN 107 and PS-CN, and for this purpose the processing unit 161 is able to control data that is to be received or transmitted by a suitable software, which for CS-CN 107 is a GSM base band application 165 and for PS-CN 109 is a GPRS base band application 167.

Receiving means 153, together with the GSM base band application 165 and the processing unit are adapted to receive a paging request from the cellular network 100 over a first communication channel GSM, i.e. from the CS-CN 107. Normally, the portable communication device 101, in more particular, its transmitting means 155, GSM base band application 165, and processing unit 161 are adapted, in response to receiving a paging request, to transmit a paging response to the cellular network (100) over a first communication channel GSM, i.e. to the CS-CN 107.

From the very nature of the GPRS, it follows that when the portable communication device 101 that is a Class B terminal is being paged by the cellular network 100, it has, by definition, after receiving the paging request, to suspend all GPRS PDP contexts, i.e. communications to the PS-CN 109. In practice this can be done by the processing unit 161 together with the GPRS base band application 167.

In the following, the exemplary embodiment is described in further detail by using the Assisted GPS A-GPS location measurement as an example. The skilled person appreciates that the embodiment is not limited to this particular example but to the scope of the claims defining the scope for which protection is being sought.

The A-GPS improves significantly the determination of the location of a portable communication device 101. Two approaches for A-GPS in GSM/GPRS have currently been defined or are at the moment being defined: sending of synchronization and other assistance information over the Radio Resource Location Protocol RRLP as defined in 3GPP 44.031 based on services of Layer 3 RR, and sending of the same RRLP information using the IP-based Secure User Plane SUPL services. The latter does not require any SS7 connection so that a circuit-switched connection during the location determination can be avoided.

The transport of the location measurement results takes place over IP carried over GPRS, i.e. via PS-CN 109. The portable communication device 101 comprises a GPS receiver 171 and a GPS application 169 that the processing unit 161 can execute. The operation of the GPS receiver 171 and of the GPS application 169 are well known as such. Since the portable communication device 101 receives GPS Assistance Information from PS-CN 109, i.e. through receiving means 153 and GPRS base band application 167, the GPS location measurement can be speeded up significantly because the GPS receiver 171 can then be synchronized to orbiting satellites much faster.

Figure 3A:
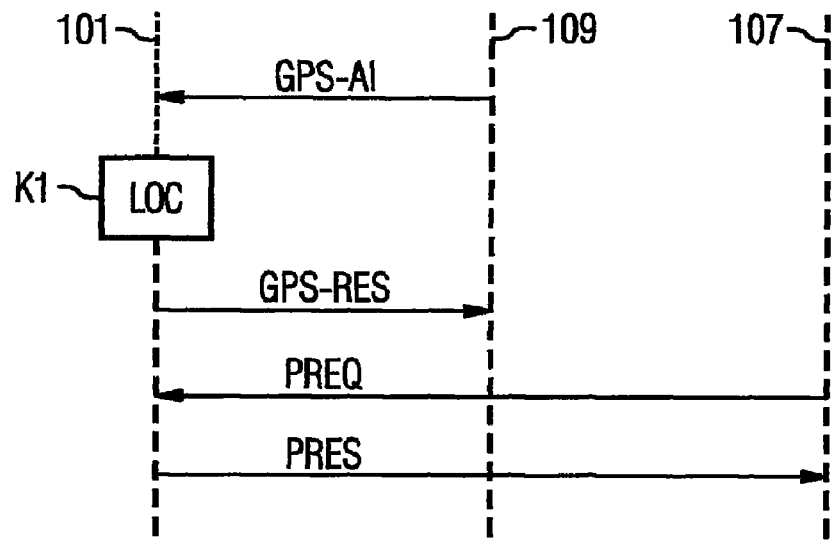
FIG. 3A illustrates the operation of a portable communication device which performs a GPS location measurement and receives a paging request after finishing the GPS location measurement.

FIG. 3A illustrates the operation of a prior art portable communication device 101 which is performing a GPS location measurement (step K1) and receives a paging request PREQ after finishing the GPS location measurement (step K1).

The portable communication device 101 receives GPS Assistance Information GPS-AI from the PS-CN 109. After performing the GPS location measurement in step K1, the portable communication device 101 returns the GPS location measurement response GPS-RES to the PS-CN 109, e.g. to a Location Service Center which is connected to the PS-CN 109.

At a later point in time, the portable communication device 20 101 receives a paging request PREQ from the PS-CN 107, and responds by sending a paging response PRES to the PS-CN 107.

Figure 3B:
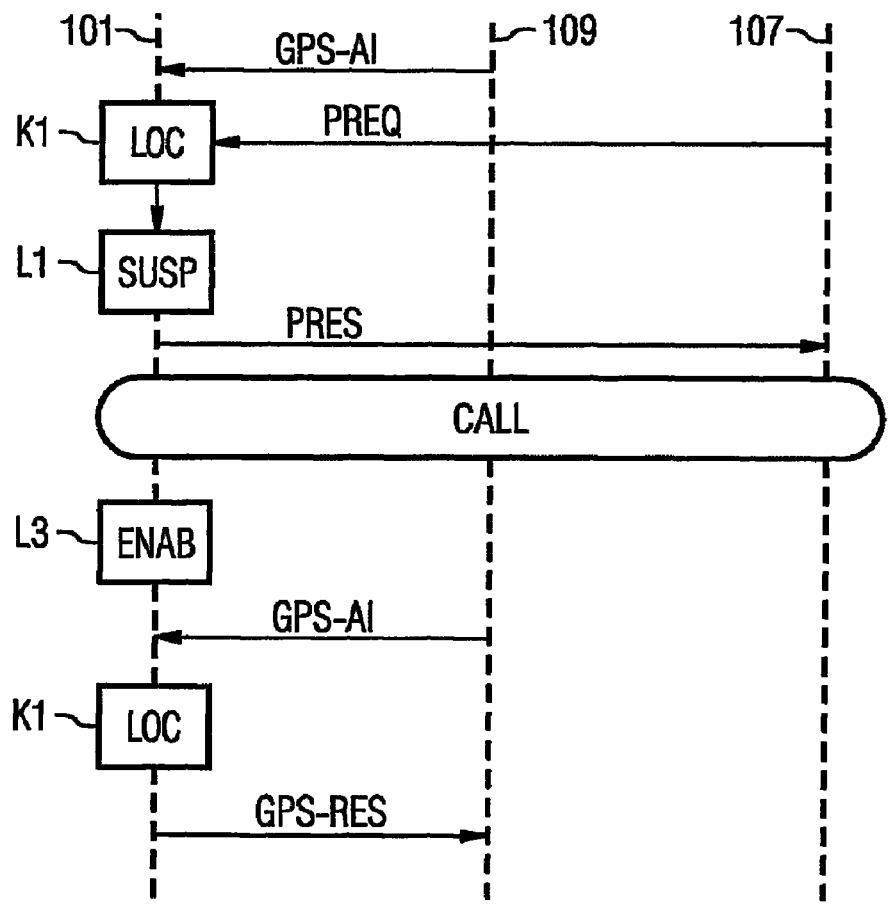
FIG. 3B shows a situation where a prior art portable communication device receives a paging request after having received GPS Assistance Information but before having transmitted the GPS location measurement response.

FIG. 3B shows a situation where a prior art portable communication device 101 receives a paging request PREQ from CS-CN 107 after having received GPS Assistance Information GPS-AI from the PS-CN 109 but before having transmitted the GPS location measurement response GPS-RES to the PS-CN 109.

The main difference as compared with the example shown in FIG. 3A is that the GPS location measurement (step K1) is abandoned in response to receiving the paging request PREQ, since the portable communication device 101 has to suspend all GPRS PDP contexts (step L1). As a consequence, the SMLC in the network will discard the on-going positioning procedure and use less accurate fall-back positioning methods (e.g. the plain Cell-ID only). After a possible call, in step L3 the GPRS PDP contexts are enabled again, after which the PS-CN has to restart the positioning procedure and to retransmit GPS Assistance Information GPS-AI, since it is not actual any more because the orbiting satellites will be in a different position relative to the portable communication device 101.

If the portable communication device 101 were ready with step K1 in a predefined time, e.g. 2-3 seconds, it would be a waste of resources both at the LCS and at the portable communication device 101 not to complete the measurement and to submit the GPS location measurement result GPS-RES to the PS-CN 109 but to suspend the GPRS PDP context.

For this reason, according to the present disclosure, the portable communication device 101 is adapted to discard the paging request PREQ or to delay transmitting a paging response PRES, if the portable communication device 101 has an established GPRS PDP context requiring an action (e.g. step K1) that can be performed within a predefined time.

Figure 4:
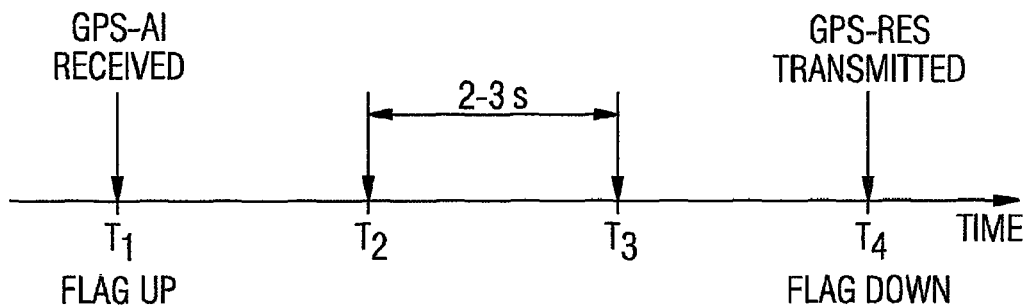
FIG. 4 is a timeline illustrating different actions.

FIG. 4 is a timeline illustrating different actions at the portable electronic device 101. At time T1, the portable electronic device 101 receives the GPS-AI. The actual GPS location measurement, step K1, is performed between time T2 and time T3. The GPS location measurement result GPS-RES is transmitted to the cellular network 100 and further to PS-CN 109 at time T4. According to one aspect of the invention, a flag is set up at time T1 and set down at time T4.

Figure 5:
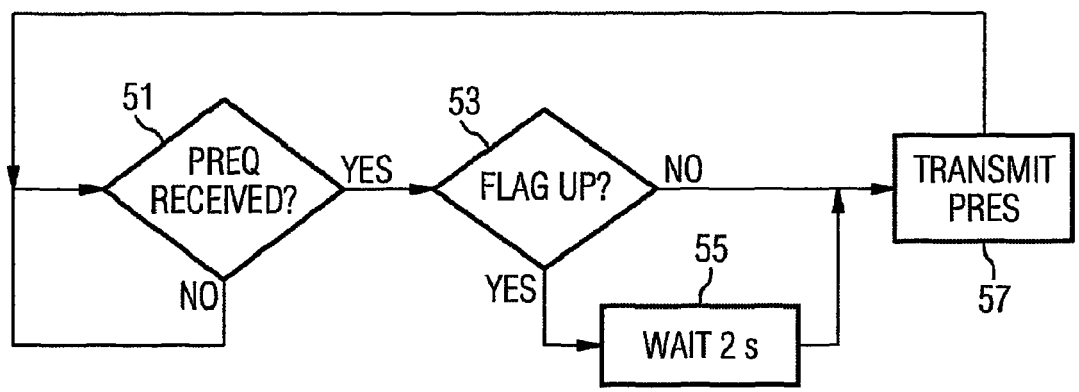
FIG. 5 is a flow chart showing the operation of a portable electronic device according an exemplary embodiment.

FIG. 5 is a flow chart showing the operation of a portable electronic device 101 according to a first aspect of the invention. When a paging request PREQ is received in step 51, in step 53 it is first checked whether the flag is up. If the flag is not up, in step 57 the paging response PRES is transmitted. If the flag is up, then after a predefined waiting time in step 55, the paging response PRES is transmitted in step 57. The predefined waiting time in step 55 may be some seconds, or the estimated duration of the action required by the GPRS PDP context.

Figure 6:
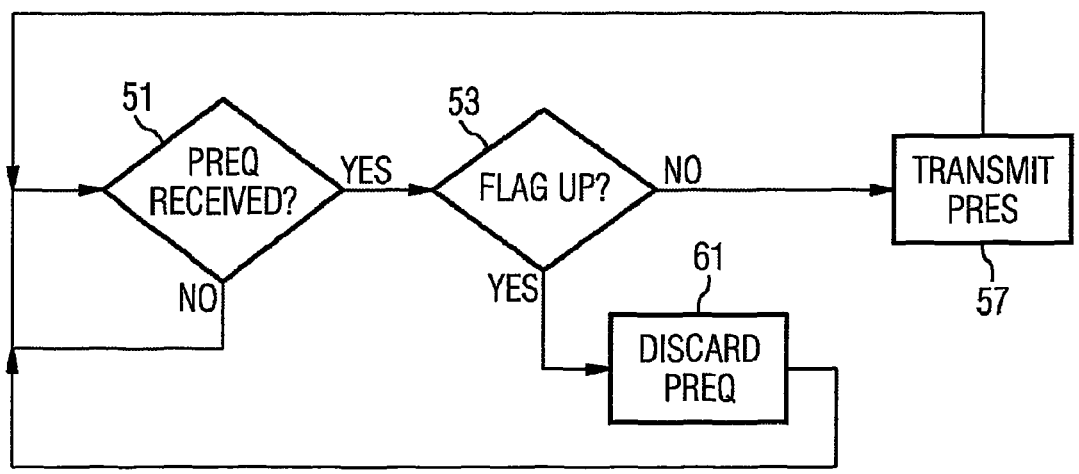
FIG. 6 is a flow chart showing the operation of a portable electronic device according another exemplary embodiment.

FIG. 6 is a flow chart showing the operation of a portable electronic device 101 according to a another exemplary embodiment. When a paging request PREQ is received in step 51, in step 53 it is first checked whether the flag is up. If the flag is not up, in step 57 the paging response PRES is transmitted. If the flag is up, in step 61 the paging request is discarded.

In other words, according to the first aspect, after receiving the paging request PREQ from the cellular network 100, the portable communication device 101 delays the sending of the paging response PRES until it has collected and sent the GPS location measurement result GPS-RES to the LCS. The portable communication device 101 therefore suspends the GPRS PDP contexts only after having sent the GPS location measurement information GPS-RES.

According to another aspect, after receiving the paging request PREQ from the cellular network 100, the portable communication device 101 checks whether it is still constructing a GPS location measurement result GPS-RES. If the answer is affirmative, the portable communication device 101 simply discards the first paging request PREQ. The cellular network 100 keeps on resending paging requests PREQ for some time, so that the portable communication device 101 can finish the location measurement (step K1) and send the GPS location measurement result GPS-RES to the LCS.

Because determining the location of a portable communication device 101 should take only some seconds when A-GPS is used, this should not deteriorate the performance of the cellular network 100 either. The proposed solution should be compatible with the existing Core Network implementations since the paging is repeated anyhow in the case that the portable communication device 101 does not answer immediately. The required response time for paging is network dependent. Furthermore, any prior art portable communication device may lose a paging request because of problems in the radio path, likewise the sending of a paging response may fail for the same reasons.

The skilled person appreciates that even though the invention has been described above by way of examples in terms of GPS positioning procedures that relate to operating a portable communication device that is a GPRS Class B capable GSM terminal, the invention is not limited to this but can be modified in the scope and spirit of the accompanying claims. Particularly, the invention may be used also for other kinds of packet-switched connections than GPRS PDP contexts and content other then Assisted GPS positioning messages.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A method of operating a portable communication device, comprising the steps of:
   receiving at the portable communication device a paging request from a cellular network over a first communication channel, and
   upon receipt of the paging request, and as a result of the portable communication device having an established packet switched connection on a second communication channel requiring an action that is performed within a predefined time, the portable communication device either (a) discarding the paging request or (b) delaying the transmission of a paging response from the portable communication device.

2. The method according to claim 1, wherein transmission of said paging response is delayed only until after the action or the portable communication device has reached a predefined state.

3. The method according to claim 1, wherein the action is GPS location determination; and wherein the portable communication device has received GPS assistance information through the GPRS connection prior to receiving the paging request but before transmitting the GPS location measurement result to the cellular network.

4. The method according to claim 3, wherein transmission of said paging response is delayed only until after the measurement result has been transmitted to the cellular network.

5. The method according to claim 1 further comprising the step of:
   suspending GPRS connection at the portable communication device after performing the action or after the portable communication device having reached the predefined state, but before transmitting the paging response.

6. A portable communication device, comprising:
   means for receiving a paging request from the cellular network over a first communication channel;
   means for transmitting a paging response to the cellular network over a first communication channel; and communication means for having a packet-switched connection over a second communication channel, wherein the portable communication device, as a result of the portable communication device having an established GPRS connection requiring an action that is performed within a predefined time, the portable communication device, either (1) discards the paging request or (2) delays transmitting a paging response.

7. A portable communication device according to claim 6, further comprising:
   means for performing a GPS location measurement using GPS assistance information received by GPRS communication means and wherein the action comprises performing GPS location measurement and/or to transmitting the GPS location measurement result to the cellular network: and the GPRS communication means transmits GPS location measurement result to a cellular network.

8. A portable communication device according to claim 7, wherein the means for receiving GPS assistance information or the means for sending GPS location measurement result to the cellular network is used on the second communication channel.

9. A portable communication device according to claim 7, wherein said portable communication device delays sending said paging response only until after the GPS location measurement result has been transmitted to the cellular network.

10. A portable communication device according to claim 6, further comprising:
    means for suspending packet-switched connections at the portable communication device after the action or the portable communication device has reached the predefined state, but before the portable communication device transmitting the paging response.

11. A method or portable communication device according to claim 6, wherein said packet-switched connection is a GPRS Packet Data Protocol (PDP) context, and said second communication channel is a GPRS communication channel, and said first communication channel is a GSM communication channel.

12. A method of operating a portable communication device, comprising the steps of:
    receiving at the portable communication device a paging request from a cellular network over a first communication channel; and
    upon receipt of the paging request, if the portable communication device is performing an action via an established packet switched connection on a second communication channel requiring an action, the portable communication device (a) delaying transmission of a paging response and (b) automatically transmitting the paging response after the completion of the action being performed via the packet switched connection or after some predetermined time delay, without interrupting the action being performed via the packet switched connection.

13. A method of operating a portable communication device, comprising the steps of:
    receiving at the portable communication device a paging request from a cellular network over a first communication channel;
    if it is determined that the portable communication device is performing an action via an established packet switched connection on a second communication channel requiring an action that is performed within a predefined time, (a) delaying the transmission of a paging response from the portable communication device and (b) automatically transmitting the paging response after the completion of the action being performed via the packet switched connection or after some predetermined time delay, without interrupting the action being performed via the packet switched connection; and
    if it is not determined that the portable communication device is performing an action via an established packet switched connection on a second communication channel requiring an action that is performed within a predefined time, automatically transmitting the paring response from the portable communication device without delay.

* * * * *